United States Patent [19]

Yamamoto et al.

[11] Patent Number: 5,215,566
[45] Date of Patent: Jun. 1, 1993

[54] METHOD OF MANUFACTURING OPTICAL ELEMENT

[75] Inventors: Kiyoshi Yamamoto, Yokohama; Takeshi Nomura, Tokyo, both of Japan

[73] Assignee: Canon Kabushiki Kaisha, Tokyo, Japan

[21] Appl. No.: 820,916

[22] Filed: Jan. 15, 1992

[30] Foreign Application Priority Data

Jan. 18, 1991 [JP] Japan .................................. 3-16828
May 7, 1991 [JP] Japan .................................. 3-130338
Nov. 25, 1991 [JP] Japan .................................. 3-334576

[51] Int. Cl.$^5$ .................................. C03B 23/00
[52] U.S. Cl. .................................. 65/29; 65/64; 65/83; 65/102; 65/158; 65/160
[58] Field of Search .................................. 65/29, 24, 158, 150, 65/64, 66, 102, 322, 83; 264/2.3, 40.1, 334, 336, 1.2; 425/808, 137

[56] References Cited

U.S. PATENT DOCUMENTS

| 442,330 | 12/1890 | Read | 65/322 |
| 1,130,918 | 3/1915 | Miller | 65/158 |
| 3,244,497 | 4/1966 | Copeland | 65/308 |
| 3,372,017 | 3/1968 | Pitbladdo | 65/29 |
| 3,418,096 | 12/1968 | Bathellier | 65/158 |
| 3,574,587 | 11/1968 | Grundy | 65/158 |
| 4,412,798 | 11/1983 | Avellino | 425/137 |
| 4,723,976 | 2/1988 | Shanaberger | 65/29 |

FOREIGN PATENT DOCUMENTS

| 49-97009 | 9/1974 | Japan . |
| 52-45613 | 4/1977 | Japan . |
| 58-84134 | 5/1983 | Japan . |
| 59-150728 | 8/1984 | Japan . |
| 60-81032 | 5/1985 | Japan . |
| 61-26528 | 2/1986 | Japan . |
| 61-32263 | 2/1986 | Japan . |
| 62-91430 | 4/1987 | Japan . |
| 63-11529 | 1/1988 | Japan . |
| 378199 | 9/1932 | United Kingdom . |

Primary Examiner—Joye L. Woodard
Attorney, Agent, or Firm—Fitzpatrick, Cella, Harper & Scinto

[57] ABSTRACT

A method of manufacturing an optical element from glass material is accommodated between an upper member and a lower member of mold. The glass material is press-molded in a state and heated to a desired temperature, thereafter being cooled and released from the mold to form a product having a predetermined optical functional surface. When the product is released from the mold, the upper mold member is first lifted by a predetermined amount, where the product may adhere to the upper mold member. Upon or after releasing and falling of the molded product from the upper mold member due to its own weight or heat stress, the upper mold member is further caused to ascend and the mold is opened so that the molded product can be taken out.

10 Claims, 7 Drawing Sheets

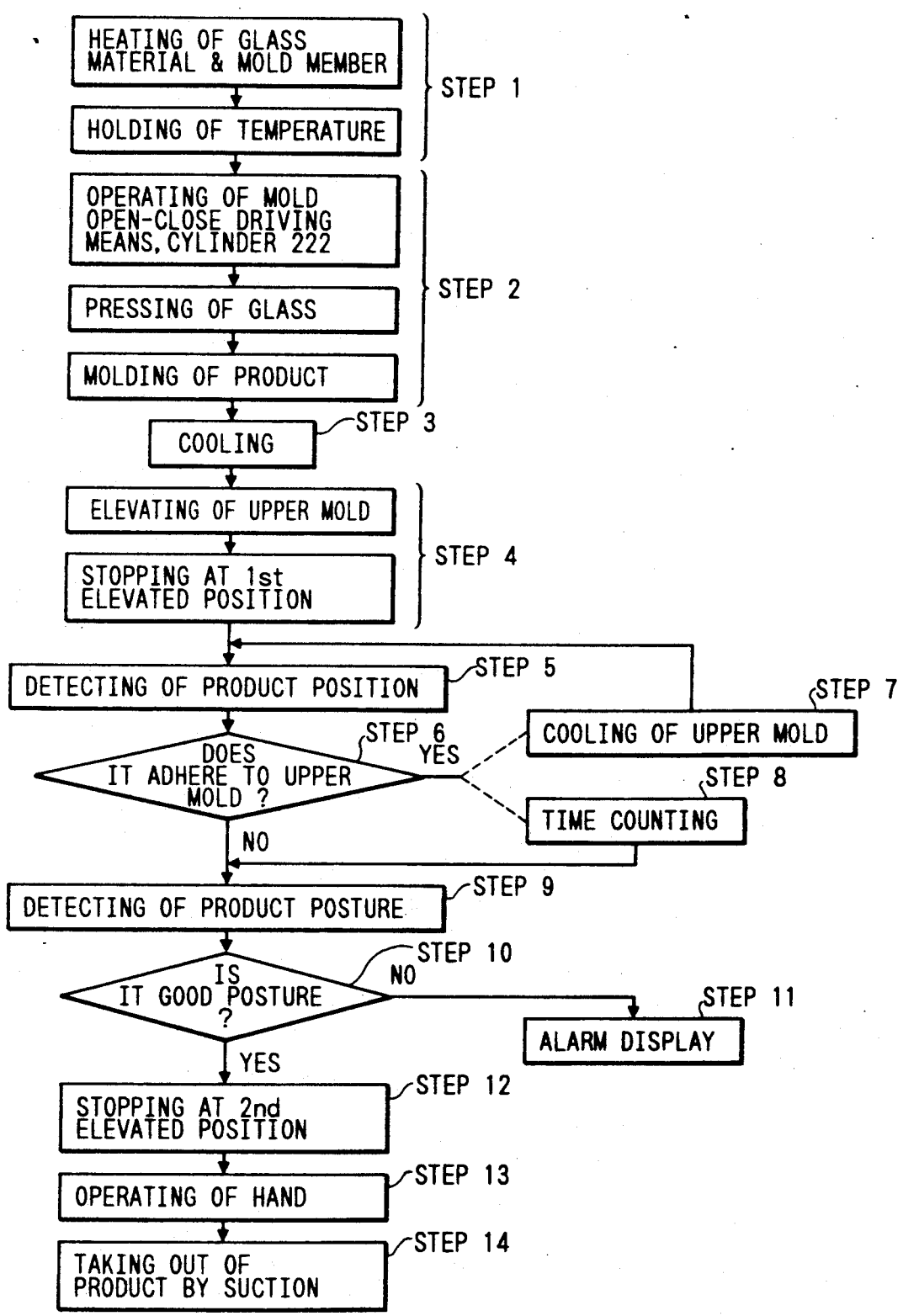

METHOD OF MANUFACTURING OPTICAL ELEMENT

BACKGROUND OF THE INVENTION

1. Field of the Invention

The present invention relates to a method of manufacturing an optical element, particularly, to a method of manufacturing a glass optical element having an optically functional surface produced directly by press-molding.

2. Related Background Art

Recently there has been developed the method of manufacturing an optical element, wherein glass material for molding of an optical element, for instance, glass blank pre-molded to certain shape is accommodated between the upper and the lower mold members having the predetermined surface precision and it is press-molded under heating, so that post-working steps such as cutting and grinding are unnecessary.

When an optical element is manufactured by such press-molding, the mold generally employed has such construction that the upper mold member and the lower mold member are set face to face slidably in the mold body and glass material for molding is introduced into the area surrounded by these members and the upper and the lower mold members are brought relatively close to each other to press it to the predetermined shape. At this time non-oxidizing atmosphere such as nitrogen atmosphere is employed to prevent oxidation of the mold members and said glass material is heated to the temperature suitable for molding, for example, to the temperature where the glass material for molding has viscosity of $10^8$ to $10^{12}$ poise, After the mold is closed, the glass material is pressed for predetermined period and the molding surface of the mold member is transferred to the surface of the material. Thereafter, said mold member is cooled down to glass transition temperature and pressing pressure is removed in such state. When molding is completed as aforesaid, the mold is opened and the product is taken out.

Alternatively, it may be so arranged that the glass material is heated to an appropriate temperature before introducing it into the mold member or the glass material is introduced into the mold member after heating them to the molding temperature. It may further be so arranged that in the process of transportation of glass material together with the mold member, the work for heating, pressing and cooling may be made continuous and at high speed.

The method of manufacturing an optical element as aforesaid and the apparatus used therefore are disclosed, for example, in the Japanese Patent Application Laid-open Nos. 58-84134, 49-97009, British Patent No. 378199, Japanese Patent Application Laid-open Nos. 63-11529, 59-150728 and 61-26528.

Here, the work for releasing product from the mold after press-molding is a problem. Immediately after pressing, the product is strongly ahered to the mold member. But, in the process in which the temperature decreases, thermal stress is produced due to the difference in thermal expansion coefficient between the mold member and the glass material, thereby releasing the product. The timing of such releasing the product is, however, not constant, and besides it is undecided whether the product is adhering to the upper mold, or the lower mold, when the mold is opened. Therefore, if the product is adhering, for example, to the upper mold, the product is released due to its own weight when the upper mold is elevated. As a result, the product falls on the lower mold, so that the product may be damaged or the molding surface of the lower mold may be damaged. When the product remains adhering to the upper mold, auto-handling is impossible in a subsequent step for taking out the product.

Such adhering of product to the upper mold is a factor to obstruct smooth operation of molding apparatus. In regard to cooling and releasing steps in the molding apparatus, there are already known Japanese Patent Application Laid-open Nos. 62-91430, 60-81032, 52-45613, 61-32263, etc. However, the manners for cooling and releasing disclosed in these patent publications are simple and no description is made for the solution of the problems related to adhering of product to the upper mold.

SUMMARY OF THE INVENTION

The present invention has been made based on the aforesaid circumstances and intends to provide a method of manufacturing an optical element being capable of performing the molding continuously and at high speed with maintaining good precision of the optical element, and avoiding the troubles of subsequent steps caused by the adherence of product to the upper mold when the product is released.

To attain such objective, the present invention is to provide a method of manufacturing an optical element, wherein glass material for molding is accomodated between an upper member and a lower member of mold, said glass material is press-molded in a state and heated to a desired temperature, thereafter being cooled and released from the mold. Thus a product having a predetermined optical functional surface is manufactured, wherein upon the product being released from the mold, the upper mold member is first lifted by a predetermined amount, and if the product is adhering to the upper mold member to follow the lifting of said mold member, upon or after releasing and falling of the product from said upper mold member due to its own weight or heat stress, the upper mold member is further caused to ascend and said mold is opened so that the product can be taken out.

Another object of the present invention is to provide a method of manufacturing an optical element, wherein in the step of taking-out the optical element of the product by using mold members after the glass material is heated and pressurized to form a shape of the optical element, the method includes the step of sensing whether or not the product is positioned in a predetermined position, that is, whether the product is in a convenient position (location) for taking-out operation with sucking or holding by hand, or in an inconvenient position for the taking-out operation, and the next operation is performed according to the result of the sensing step, for example, the operation is shifted to the step of shifting the mold members to the position for taking-out the product, or the step of taking-out of the product is performed upon/after falling of the product onto the mold member convenient for taking-out if the product is adhering to the mold member inconvenient for taking-out, whereby the operation of taking-out of the product is smoothly performed.

Also, the present invention provides the manufacturing method, wherein in the step of taking-out the product after heating, pressurizing and cooling of the glass material, when the state of closed mold members is shifted to the state of open mold members for taking-out the product, the mold members are open in a state that the product is adhering to the upper mold members, in which the step of opening is performed in a distance so that the product may be prevented from the damage due to falling of the product from the upper mold member onto the lower mold member, and after confirming the position of the product, the opening to the taking-out position is performed.

Further, the present invention provides the manufacturing method with the steps of performing continuously by repetition of the steps of heating of glass material and mold members, pressurizing of glass material, cooling of the product and taking-out of the product, wherein cycle time of the step is shortened by designing the step to end cooling and/or start heating in correlation to the confirmation of the position of the product upon opening of the mold member.

Further, the present invention provides the countermeasures against the troubles in the automatic product take-out operation executed by machinery in the step of taking-out of the product following the step of heating, pressurizing and cooling of the glass material and the mold member.

That is, the step of taking-out of the product should be so designed that when the mold opens while the product is adhering to the upper mold member, and thereafter the product falls on the lower mold member, the product optical element should take the posture enabling suction and holding by robot hand.

After molding at around glass molding temperature (glass viscosity is $10^{8-12}$ poise), molding atmosphere of said glass material is cooled down to the temperature range where glass does not deform but yet the temperature of glass in the step of taking-out of the product is at a high level of around 300° C. and consequently the material of construction of hand finger for suction and holding should unavoidably be metal or ceramic.

Therefore, when hand finger is made to suck and hold the product by two or three dimensional operation, unless the product posture is a predetermined posture being carried on the lower mold member, the product may be damaged or unsucked or not duly held by the hand finger.

In order to solve the aforesaid problem, the present invention provides the method of manufacturing an optical element wherein the step of checking the posture of the product is provided in the step of taking-out of the product after molding so that only after such checking, the succeeding operation should be executed.

BRIEF DESCRIPTION OF THE DRAWINGS

FIG. 11 is a flow chart to show the manufacturing process of the present invention using the aforesaid apparatus.

DETAILED DESCRIPTION OF THE PREFERRED EMBODIMENTS

Figure 1:
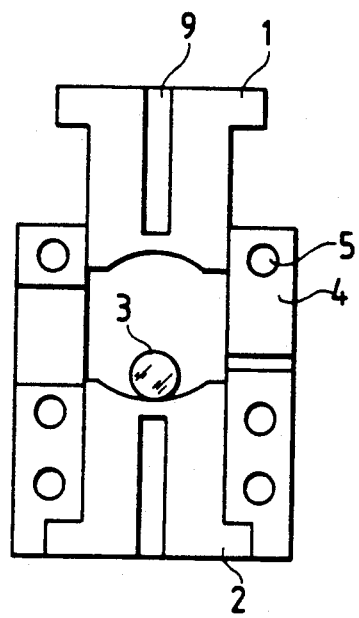
FIG. 1 is a view for schematic construction to explain an embodiment of the present invention.
Figure 2:
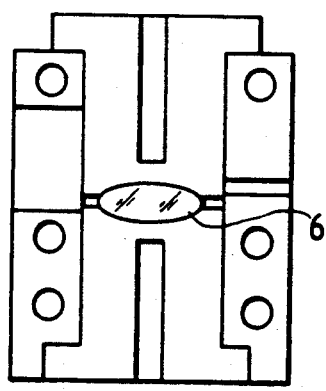
FIG. 2 is a view for schematic construction to explain said embodiment.
Figure 3:
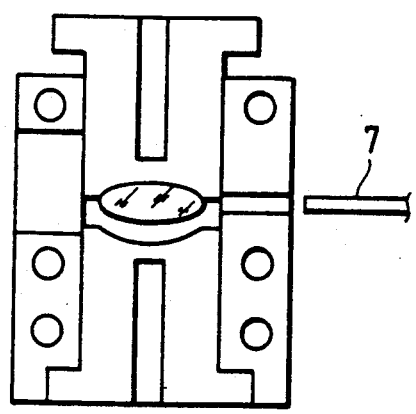
FIG. 3 is a view for schematic construction to explain said embodiment.
Figure 4:
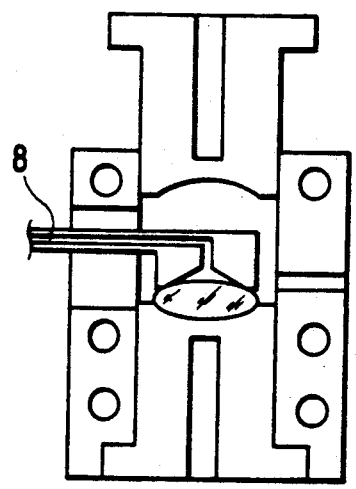
FIG. 4 is a view for schematic construction to explain said embodiment.
Figure 5:
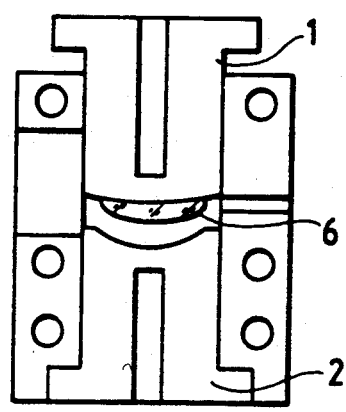
FIG. 5 is a view for schematic construction to explain another embodiment of the present invention.

Now the manufacturing method according to the present invention will be described on the basis of the embodiments shown in the drawings. Hereunder is described the case to mold biconvex lens of 16 mm in diameter formed of a glass blank. The glass blank used here is the spherical glass material 3 made of optical glass SK12 and its surface roughness is $R_{max} = 0.04$ μmm. The mold shown in FIG. 1 is housed in the casing (not shown) and said casing is decompressed to $10 \times 10^{-2}$ torr, followed by introducing of nitrogen gas. The upper mold member 1 and the lower mold member 2 constituting said mold are heated to 610° C. by a heater 5 provided in a body mold 4 surrounding them. When said mold members 1 and 2 are heated to 610° C., said glass material 3 preheated in the same casing is sucked by a suction hand 8, and through the inlet/outlet port opening in the body mold 4 it is placed on the lower mold member 2. Then, by operating means such as ram, said upper mold member 1 is caused to descend to execute press-molding. Descending of said mold member 1 continues until the stopper provided at the upper edge of the mold member 1 comes in contact with said body mold 4. Under such stage, said glass material 3 is molded to the product (refer to FIG. 2). Thereafter, the heater 5 is electrically disconnected, and for instance nitrogen gas is introduced into a cooling conduit 9 provided at the mold members 1 and 2 to perform cooling. When the upper and the lower mold members 1 and 2 are cooled to the temperature below the transition temperature of glass, for instance, to 510° C., the upper mold member 1 is lifted again through the said operating means. At this time, lifting of the upper mold member 1 is temporarily interrupted at the elevation of, for instance, about 3 mm (refer to FIG. 3) so that a product 6 may not be damaged, even when the product 6 is lifted together with the upper mold member 1 adhering thereto and is released and falls on mold member 2 due to its own weight or generated thermal stress. Said elevating amount is described 3 mm in the present embodiment, but it may be less than 15 mm, preferably less than 5 mm. At such stage, judgment is made, by using a sensor 7, whether or not the product 6 is adhering to the surface of upper mold member 1. If the product 6 is not adhering, then immediately, the lifting of the upper mold member 1 is performed again. If the product 6 is adhering said lifting is performed again after waiting until the product 6 falls on the lower mold member (usually it falls within about 5 second). When the mold member 1 is lifted to the predetermined elevation, the product 6 left on the lower mold member 2 is sucked and held by the suction hand 8 through the inlet/outlet port in the body mold 4 and taken out of the mold (refer to FIG. 4).

The molding of the optical element was conducted by using such molding apparatus in the continuous molding of about 100 shots. As a result, good result has been obtained with surface accuracy of the optical element having about two Newton rings and astigmatism and contour map of the surface of 0.5, and the molding could be performed with good continuous working. There was no accident such as breaking of the product 6 or injury of the lower mold member 2 caused by adherence of product 6 to the upper mold member 1. Also, there was no interruption of working, resulting in the improvement of work efficiency. Also, when convex meniscus lens with diameter of 26 mm was manufactured by press-molding with said molding apparatus using glass blank made of optical glass SF8 after the temperature of the upper and lower mold members 1, 2 reaches 510° C., and the product is released at 370° C., continuous operation of 100 shots was possible avoiding trouble, although adherence of the product to the upper mold member 1 was observed in several cases.

As aforesaid, according to the present invention, the upper mold member is lifted a predetermined amount upon releasing. If the product adheres and follows said mold member, it is detected, for example, by a sensor. After waiting until releasing and falling of the product from the upper mold member due to its own weight or thermal stress, the upper mold member is further elevated and the mold is opened to enable taking out of the product, thereby making it possible to mold the product continuously or at high speed while maintaining preferred precision of the optical element and to avoid subsequent trouble due to adherence of product to the upper mold member upon releasing.

The manufacturing method according to the present invention can be applied to the manufacture of actual optical element shown hereinbelow. Now the manufacture of said optical element is described concretely using the apparatus shown in FIGS. 6 and 7 and its process in reference to the time chart of FIG. 8.

In the drawings, numeral 102 denotes a casing. 104a, 104b denote supports for the casing 102. Said casing 102 has such construction that replacement chamber 108 is provided on the side of the molding chamber 106, and said molding chamber 106 and displacement chamber 108 are insulated from external atmosphere. Said molding chamber 106 and displacement chamber 108 are partitioned by closed gate valve 110 provided between there. Between the lower section of said displacement chamber 108 and the exterior is provided a gate valve 112 which can be tightly closed.

At the lower part of said gate valve 112 is provided a delivery/take-out means 120 by which molding material is delivered from the outside into displacement chamber 108 and further molded optical element is taken out from inside of the replacement chamber 108 to the outside.

In the neighborhood of the replacement chamber 108 is provided transportation means 122 for transporting the molding material in the replacement chamber 108 to the inside of the molding chamber 106, further, transporting the molded optical element from the inside of said molding chamber 106 to the inside of the replacement chamber 108.

Figure 7:
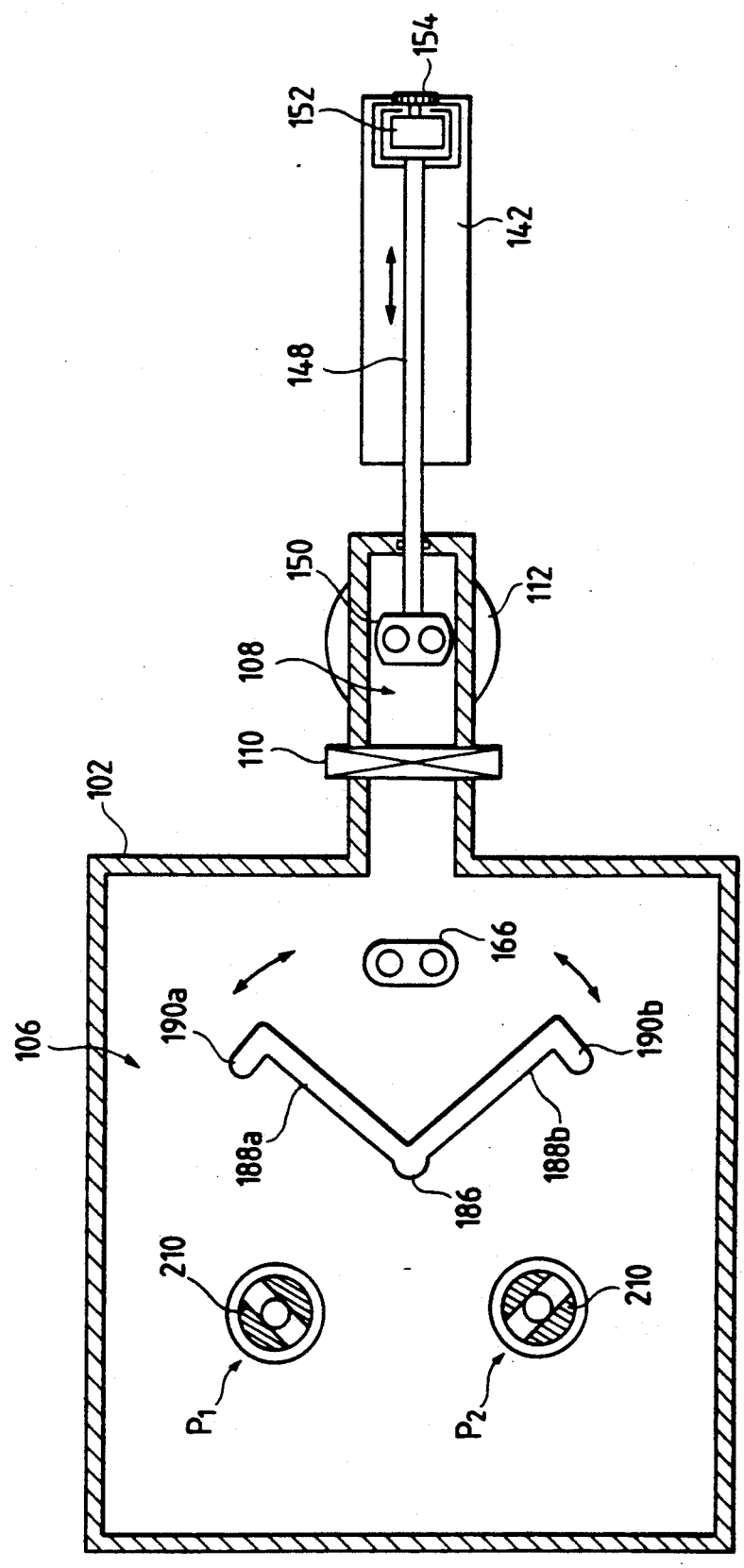
FIG. 7 is a transverse cross-sectional view of the main part of the apparatus of FIG. 6.

In the molding chamber 106 are provided heater 124, transporting means 126 and press portion 128. The press portion 128 is equipped with two equivalent press molders $P_1$ and $P_2$ installed in parallel as shown in FIG. 7. The heater 124 is so arranged as to receive the molding material transported into molding chamber 6 by said transporting means 122. The material is heated by the heater 124 to an appropriate temperature, and the molded optical element can be received from said transporting means 126 in the heater 124. Said transporting means 126 transports the material for molding located at said heater 124 to the press portion 128 and acts to transport the molded optical element in the press portion to the heater 124. At the press portion 128, the molding material transported by the transporting means 126 is heated to an appropriate temperature and then pressed by the mold members for molding. The details of the above sections are described hereinbelow.

Said delivery/take-out means 120 is so designed that the cylinder 132 is supported by the supports 134a and 134b, its piston rod 136 being able to move in a vertical direction. In the upper end of the piston rod 136 is installed the mounting table 138 on which molding material or a molded optical element are placed. The mounting table 138 has two mounting sections set in parallel in the direction perpendicular, for instance, to the surface of drawing of FIG. 7 so that molding material or two molded optical elements can be placed corresponding to the press molders $P_1$ and $P_2$ installed in said molding chamber 106 as press portion 128. The mounting table 138 is so arranged as to enter into or exit from the replacement chamber 108 by the action of said cylinder 132 when gate valve 112 is in an open state. The molding material and the molded optical element are transferred at the upper or lower end position of its moving stroke.

In the transporting means 122, rod-less cylinder 142 is supported horizontally by rod-less cylinder supports 144a and 144b, with its longitudinal axis facing toward the replacement chamber 108. A bearing member 146 which is caused to make motion in its longitudinal direction by said rod-less cylinder 142 is installed. The transporting axis 148 is rotatably supported in this bearing member 146 at its one end, in the state parallel to its moving direction, i.e., taking horizontal position. The other end of the transporting axis 148 extends toward the inside of the replacement chamber 8 and its end is fixed to the suction means 150 to effect suction of molding material or a molded optical element. The bearing member 146 is equipped with a rotary motor 152, output gear 154 and gear 156 which gears with said gear 154 in order to drive said transporting axis 148 for rotation.

Two suction portions are provided to the suction means 150, respectively, at its top and bottom surfaces in correspondence to the layout of two mounting sections of said mounting table 138 (refer to FIG. 7). The suction portions in the top and bottom surfaces are so arranged as to turn around up and down when the transporting axis 148 rotates 180°. Preferably, a heater should be housed in the suction means 150.

Movement of the suction means 150 in a horizontal direction is effected in the stroke between the position inside the replacement chamber 108 positioned above the mounting table 138 (position indicated in FIG. 6) and the position of the heater 124 inside the molding chamber 106, when the gate valve 110 between the replacement chamber 108 and the molding chamber 106 is in the open state.

In the heater 124, a cylinder 162 is fixed to the casing 102 at a lower side of the molding chamber 106 in such state that its piston rod 164 is inserted into the molding chamber 106. To the upper end of said piston rod is fixed to a mounting table 166 for mounting the molding material or a molded optical element. In the mounting table 166 are installed in parallel two mounting members, for instance, in the direction perpendicular to the drawing surface of FIG. 7 so that molding material or two molded optical elements may be mounted on the two mounting members.

Above the mounting table 166, a heating cylinder 168 is provided with the heater 124 in such state that it is suspended by a supporting member 170. The lower end of the cylinder 168 is open, and a heater 172 is attached to the surface of its inner circumference. Up-down movement of the mounting table 166 is effected between the right below point where the suction means 150 reaches (position indicated in FIG. 6) and the point inside the heating cylinder 168.

In the transporting section 126, a cylinder 182 is fixed to the casing 102 at the down side of molding chamber 106, and a rotary sleeve 186 is coupled rotatably to the piston rod 184. The sleeve 186 is inserted into the molding chamber 106 through the wall of casing 102. The sleeve 186 is so arranged as to be rotated by driving means 192 which is provided in the piston rod 184. In the molding chamber 106, the sleeve 186 is provided at its upper end with branched arms 188a and 188b which extend in a horizontal direction. To the end of these arms 188a, 188b are respectively fixed suction means 190a and 190b. Suction means 190a at one side corresponds to the press molder $P_1$, and suction means 190a at the other side corresponds to the press molder $P_2$. Suction portions is respectively provided at the lower-plane of the suction means.

Figure 6:
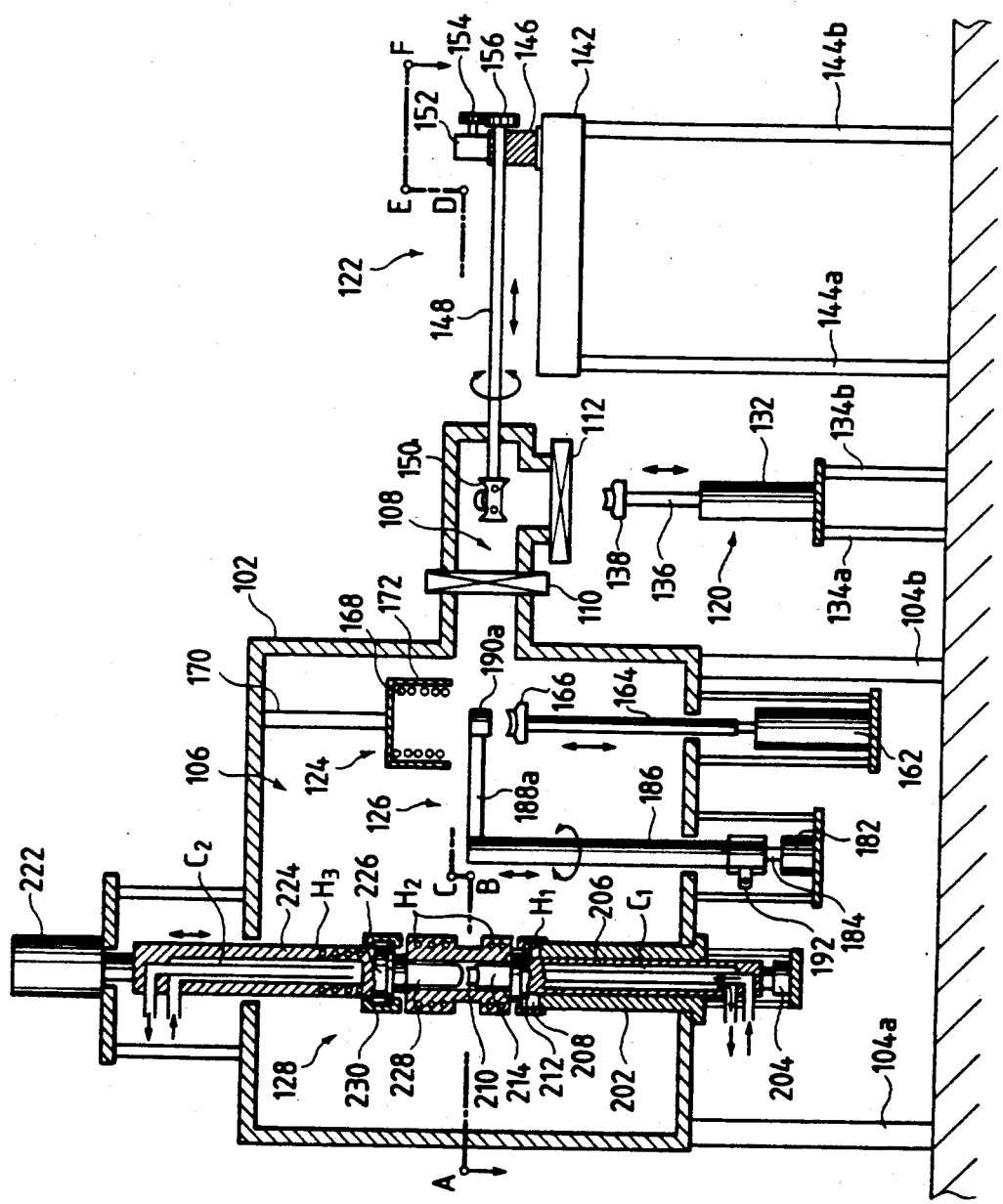
FIG. 6 is a longitudinal cross-sectional view of an embodiment of an apparatus to which the present invention is applied.

When the sleeve 186 is caused to rotate, the suction means 190a rotates accordingly between the right above point of the upper end of the mounting table 166 and the position of the press molder $P_1$ via the intermediate position shown in FIG. 6. The suction means 190b rotates between the right above the upper end of the mounting table 166 and the position of the press molder $P_2$ via the intermediate position shown in FIG. 6.

In the press portion 128, fixed cylinder 202 extending vertically is fixed to casing 102. A cylinder 204 is attached to the lower end of the fixed cylinder 202 outside the molding chamber 106. To the piston rod of the cylinder 202 is connected a lower shaft 206 which slides and can move vertically in relation to the fixed cylinder 202.

A cylindrical body member 210 is mounted on the upper end section of the fixed cylinder 202 via ring shaped heater plate 208 in such state that its lower end is fixed to the fixed cylinder 202 by holding ring 212. On the upper end section of said lower shaft 206 is installed a lower mold member 214 so as to be housed in the body member 210 vertically slidably.

A cylinder 222 is attached to said casing 102 so as to be positioned above the molding chamber 106. An upper shaft 224 is attached to its piston rod, passing through the wall of said casing 102, coaxially with the lower shaft 202 so that the lower end of the upper shaft 124 is formed in a convex spherical shape. Spherical seat 226 is in contact with the lower end of the upper shaft 224 so that the upper surface of the concave spherical shape of the seat 226 corresponds to the convex spherical shape of the shaft 224. The spherical seat 226 will act as automatically aligning upon pressing. An upper end flange of upper mold member 228 is installed at its lower side of the seat 226. The upper flange is engaged by holding ring 230 against the upper shaft 224. The upper mold member 228 is housed in the body member 210 so as to slide in a vertical direction in relation to the body member 210.

The upper end plane of the lower mold member 214 and the lower end plane of the upper mold member 228 are transfer surfaces corresponding to the optical functional surfaces of the optical element to be molded, respectively, and are finished to the desired surface precision. Coolant circulating paths $C_1$ and $C_2$ are provided respectively in the lower shaft 206 and the upper shaft 224. Heater $H_1$, $H_2$ and $H_3$ are housed respectively in the heater plate 208, body member 210 and lower part of upper shaft 224, respectively. Thermocouples (not shown) for detection of temperature are housed respectively in the lower mold member 214 and the upper mold member 228 in this embodiment.

Figure 8:
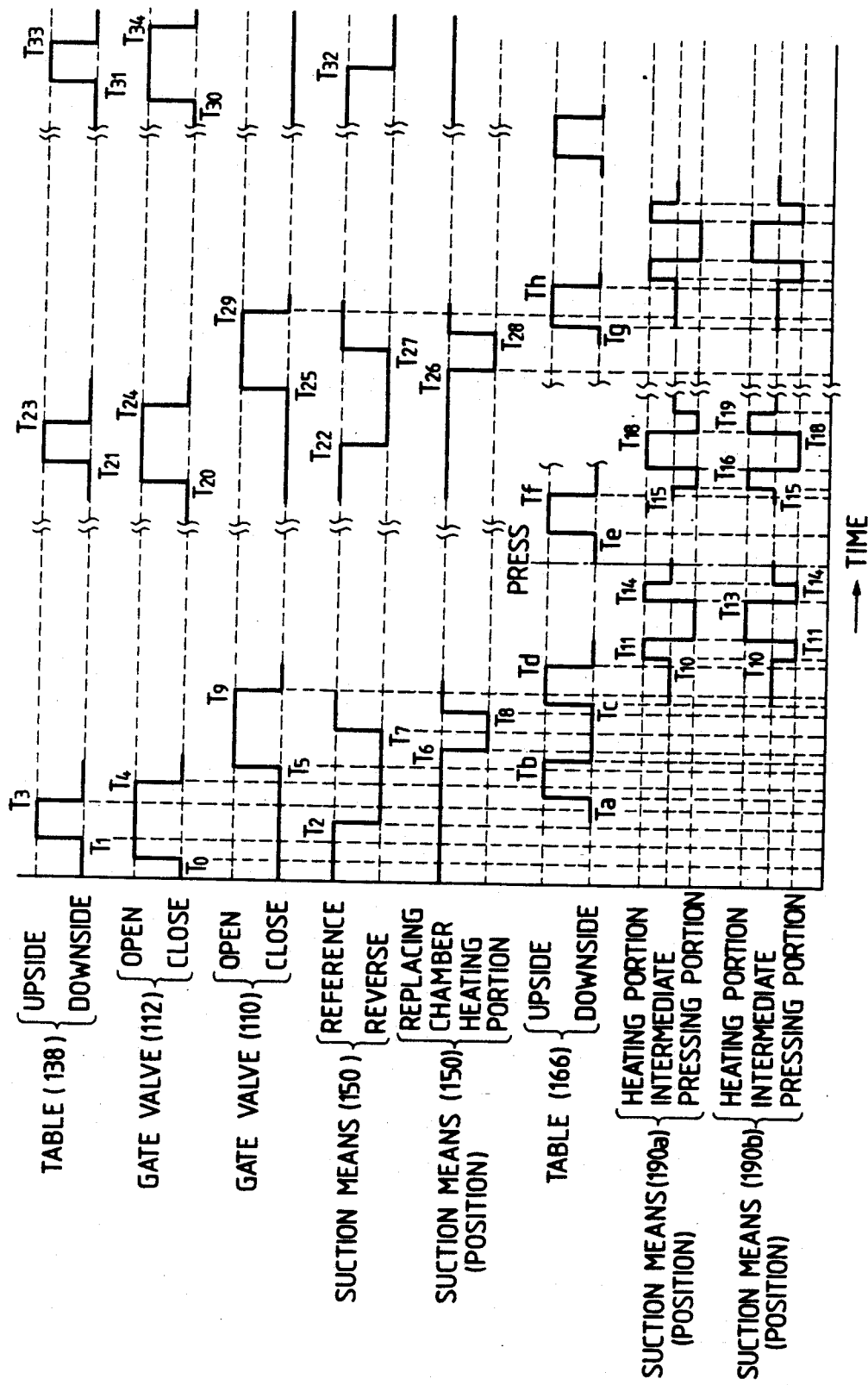
FIG. 8 is a time chart to show the manufacturing process of the present invention using the apparatus of FIG. 6.

Next, the performance of said apparatus is described concretely in reference to FIG. 8. Inside of molding chamber 106 is filled with nitrogen atmosphere by nitrogen gas supply system (not shown). At this time, gate valves 110 and 112 are closed. Then, gate valve 112 is opened ($T_0$). Two molding materials are mounted on mounting table 138 at the lower part shown in FIG. 6, mounting table 138 is lifted by cylinder 132, and it is introduced into replacement chamber 108 via gate valve 112 ($T_1$). The molding material is sucked by the suction portion at the lower plane of suction means 150 in the replacement chamber 138. Rotating position of suction means 150 is such state is called "reference state". The state having rotated 180° therefrom is called "reverse state". Said suction is effected by air suction means (not shown).

Next, the mounting table 138 is slightly lowered, transportation shaft 148 is caused to rotate 180° by rotary cylinder 152, and suction means 150 is turned up and down in the replacement chamber 108 ($T_2$). Thereupon, the molding material is positioned in the upper plane side of suction means 150. Then, the mounting table 138 is caused to descend from the position inside the replacement chamber 108 to the lower position outside the replacement chamber 108 ($T_3$). Then, gate valve 112 is closed ($T_4$), and the replacement chamber 108 is decompressed by decompression means (not shown). The molding material is preheated by the heater housed in the suction means 150.

Then, nitrogen gas is supplied to the replacement chamber 108 by nitrogen gas supply system, and after filling the inside of the replacement chamber 108 by nitrogen atmosphere, gate valve 110 is opened ($T_5$). Then, transporting shaft 148 is moved to molding chamber 106 by cylinder 142, and suction means 150 is guided to the position of heater 124 inside the molding chamber 106 ($T_6$).

The mounting table 166 is lifted to the upper limit position by cylinder 162 prior to the arrival of the suction means 150 (for instance in the timing of $T_a$). For appropriate time ($T_a$ to $T_b$) the mounting table 166 is positioned in the heating cylinder 168, thereby to be heated to an appropriate temperature, and then (prior to the timing $T_6$) it is caused to descend to the position shown in FIG. 6.

Under such state, transportation shaft 148 is rotated by 180° by the action of rotary cylinder 152, whereby the suction means 150 which has already arrived at the upper part of mounting table 166 is turned up and down ($T_7$). Then, the mounting table 166 is slightly lifted to be brought close to the lower surface of the suction means 150, and under such state, suction by the suction means 150 is released and the molding material is received by the mounting table 166. Since the mounting table 166 is preheated, when molding material is placed on it, said molding material does not crack due to temperature shock.

Next, said mounting table 166 is caused to descend to the position (lower limit position) shown in FIG. 6. Then, transportation shaft 148 is moved horizontally, and suction means 150 is allowed to retract to the replacement chamber 108 ($T_8$). Under such state, gate valve 110 is closed ($T_9$).

Mounting table 166 on which molding material is placed is lifted by the action of the cylinder 162 after the suction means 150 has retracted into the replacement chamber 108 ($T_8$). After that, gate valve 110 is closed ($T_9$), and mounting table 166 is left in the heating cylinder 168 for appropriate time ($T_c$ to $T_d$) within the time zone until timing $T_{10}$ (to be stated later) and it is heated to an appropriate temperature.

Then, arms 188a and 188b are caused to rotate by rotation driving means 192, whereby suction means 190a is first positioned above the mounting table 166 ($T_{10}$), the mounting table 166 is lifted slightly by cylinder 162 in the heating section, and the first molding material on said mounting table 166 is sucked by the suction means 190a, and then mounting table 166 is caused to descend slightly again. Then, arm 188a and 188b are rotated by rotary driving means 192 to shift suction means 190a toward the first press-molding machine $P_1$($T_{11}$). Here, molding material $G_1$ sucked by suction means 190a is guided to the inside of the body member through the opening 211 provided at the side of body member 210, and there the suction means 190a is caused to descend slightly by the cylinder 182 at the transporting section. The molding material is placed on the lower mold member 214.

On the other hand, suction means 190b is allowed to move toward the second press-molding machine $P_2$ at the same timing as $T_{10}$, and also at timing $T_{11}$, suction means 190b moves to the position above the mounting table 166. At timing of $T_{11}$, mounting table 166 is lifted slightly by cylinder 162 in the heating section, the second molding material on the mounting table 166 is sucked by the suction means 190b. The mounting table 166 is again caused to descend slightly.

Following thereto, the arms 188a and 188b are rotated, and suction means 190b is shifted toward the second press-molding machine $P_2$($T_{12}$). Here, as in the case of the first press-molding machine $P_1$, molding material sucked by suction means 190b is guided to the inside of the body through the opening provided at the side of body member 210. The suction means 190b is allowed to descend by cylinder 182, and molding material is placed on the lower mold member 214. Then, arm 188a and 188b are caused to rotate, and suction means 190b is brought back from the second press-molding machine to the intermediate position ($T_{14}$). Suction means 190a is moved to the position above the said mounting table 166 at said timing $T_{12}$ and brought back to the intermediate position at said timing $T_{14}$. Thus, the state shown in FIG. 7 is established.

Next, at press portion 128 (press-molding machine $P_1$ and $P_2$), press-molding is conducted. When molding material $G_1$ is introduced to the inside of the body member 210, the upper shaft 224 remains lifted above by cylinder 222, whereby the upper member 228 moves to the elevated position in the body member 210 and thus opening 211 at the side of said body member communicates with the cavity in the mold member. Therefore, molding material $G_1$ may be introduced from here into the cavity.

At pressing time, the upper shaft 224 is shifted downward by the cylinder 222, the upper mold member 228 blocks the opening 211 of the upper body member 210 and the cavity is blocked. When the upper mold member 228 is pressed downward, molding material in the cavity is press-molded and optical element $G_2$ is molded. The upper mold member 228 continues to descend until ultimately the lower end of holding ring 230 contacts the upper end of body member 210.

Figure 9:
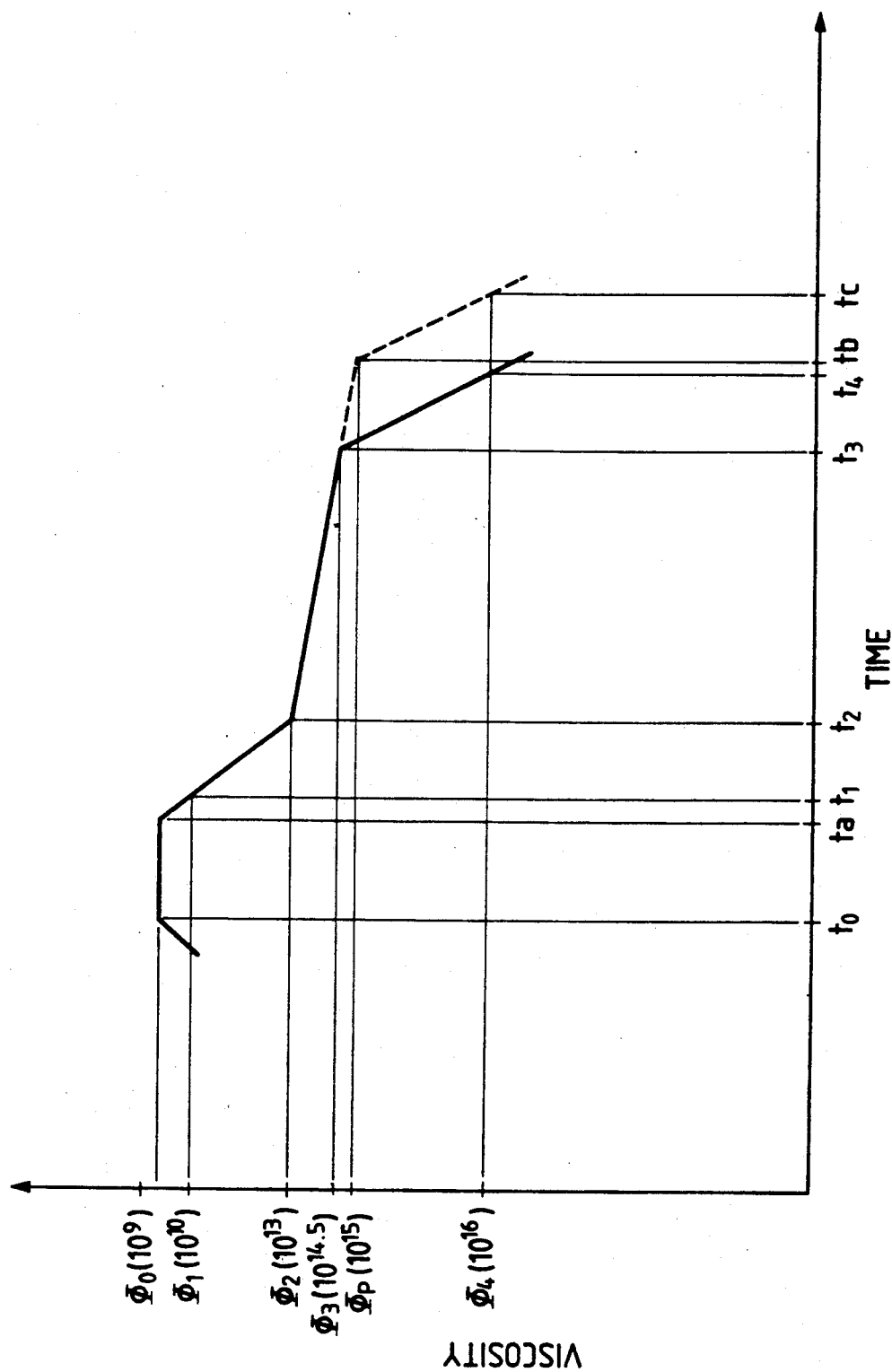
FIG. 9 is a time table for temperature control of the apparatus of FIG. 6.

Next, temperature change of optical element during said press-molding and after its molding shall be explained. FIG. 9 is the graph to indicate the temperature change of molding material and the molded optical element. Here, the temperature is indicated in terms of viscosity of material glass for molding.

As aforesaid the molding material is heated by preheating up to the temperature close to the level where molding is possible until it reaches the press section 128. As the molding material, it is preferred to use the material having the shape corresponding to the shape of the optical element and the surface corresponding to the optical surface of the optical element with surface roughness of $R_{max}$ of 0.04 μm or less. After accommodating the molding material into the mold, it is heated by heaters $H_1$, $H_2$ and $H_3$. Then, the molding material is press-molded after heating, for instance, to the temperature ($\phi_0$) in the range corresponding to the glass viscosity of $10^9$ to $10^{10}$ poise. Press-molding pressure of the upper mold member 228 is applied to the molding material from time $t_0$, and thereafter at time $t_a$, the lower end of holding ring 230 contacts the upper end of body member 110. At this stage, the product of optical element is molded to the predetermined shape.

Temperature range corresponding to the glass viscosity of $10^9$ to $10^{10}$ poise is sufficient temperature to realize preferred pressing. That is, within this temperature range, it is possible to shorten the time required for pressing step while preventing fusion between glass and the mold member. In this pressing step, the temperature difference between the upper mold member 228 and the lower mold member 214 is preferably within 5° C. When this temperature difference is too large, the amount of contraction of the upper surface and the lower surface the molded optical element in the succeeding cooling step differs from each other and it is difficult to obtain the preferred surface precision of the optically functional surface.

Said cooling starts at time $t_a$. At such cooling time, heating by the heaters $H_1$, $H_2$ and $H_3$ is interrupted, and coolant, for instance, nitrogen gas for cooling is passed through coolant circulation paths $C_1$, $C_2$.

Figure 10:
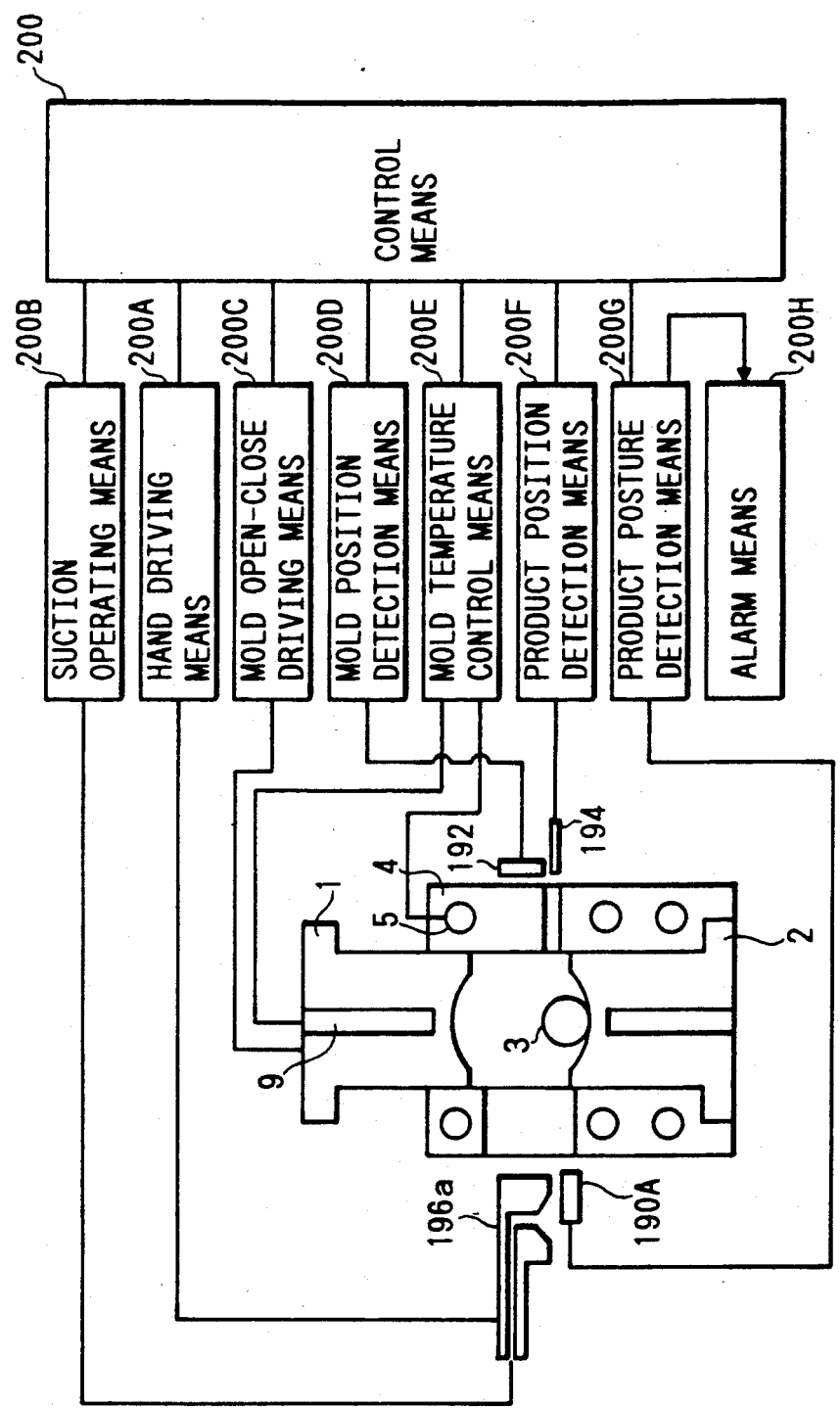
FIG. 10 is a view for schematic construction to explain the control for realizing the manufacturing method of the present invention.

FIG. 10 is a block diagram to explain the manufacturing method according to the present invention, particularly the method of its control, and FIG. 11 is the flow chart of its operating procedure.

Here, the hand driving means 200A controls the operation of cylinder 182 to drive hand 190a according to the command given by the control means 200 such as CPU. Sunction operating means 200B controls the suction operation of the hand 190a according to the command of the control means 200 to feed back the signal indicating the state of completion of suction by hand 190a to the control means 200. Mold open-close driving means 200C controls the operation of cylinder 222, according to the command of control means 200 to control shifting of the upper mold member 128.

Mold position detecting means 200D is electrically connected to the position sensor 192 placed in correspondence to the outer circumference of the upper mold member 128 to detect the position of sensor dog (not shown) provided at the upper mold member 128, thereby to control the upper mold member to shift to the respective elevated positions or to stop, as stated below. The position sensor 192 outputs the signal indicating the closure position where the upper mold member 128 is closed to the lower mold member, the signal of the first elevated position for confirming whether or not the product is sucked to the molding surface of the upper molding member 128 when the upper mold member 128 is elevated from the closure position, and the signal of the second elevated position where the upper mold member further is elevated from the first elevated position, the mold is opened, the hand 190a is inserted into the mold, and the product is taken out. This signal is sent to control means 200 through the mold position detecting means 200D.

Mold temperature control means 200E performs the electrical control of heaters $H_1$, $H_2$ and $H_3$, the control of flow rate of coolant through the coolant paths and the control of the signal output of temperature sensor (not shown in the drawing) to effect heating of the mold member and cooling of the mold member and product.

Product position detecting means 200F is connected to the product position detecting sensor 194 to detect the position of product when the upper mold member 128 shifts to the first elevated position. The means 200F has the function of converting the judgment of whether the product is adhered to the molding surface of the upper mold or not into an electric signal and transmitting such signal to the control means 200. In this case, the position detecting sensor 194 detects presence or absence of a reflection signal to indicate the adherence of a product to the upper mold by using, for instance, light projection-reception type photo-sensor, thereby judging whether the product is adhering to the upper mold member or not.

The photo-sensor to be used in said embodiment may be a reflection type or a transmission type. However, generally such sensor does not withstand a high temperature more than 500° C. at around the mold, therefore, it is necessary to provide a cooling means around the sensor.

Altherrnatively, it is possible to use a gas differential pressure type sensor as the sensor in said embodiment. This sensor system is such that the gas is blown and the presence of an object (product) is judged by the pressure difference of the gas caused by presence or absence of an object (product) blocking such gas.

In said embodiment, the case using the single sensor as the detecting means is shown, but it goes without saying that an alternative sensor may be used for detection of state of adherence of the product to the upper mold member 1, and another sensor for detection of the state of mounting and staying of the product at the lower mold member 2.

Numeral 200G denotes the means for detecting the posture of the product in the case when the product remains at the molding surface of lower mold member upon molding, or when the product falls from the upper mold member, after adhering to the upper mold member. The product posture detecting means 200G is connected to posture detection sensors 196A, 196B and 196C (not shown).

Posture detection sensors 196A, 196B and 196C are composed of light projection and receiving sensors arranged at equal interval angles of 120° C. around the outer-circumference of the body member 210. These sensors project equal light signals from light projection sections of each sensor. The reflected light signal received on the light receiving section of the sensor is inputted to the product posture detection means 200G. The state of posture of products is judged by the degree of the signals intensity. To the control means 200 is transmitted the signal of judging whether or not the posture of the product is in a proper state enabling suction by hand.

Next, the procedure of steps of the operation will be explained in reference to the flow chart of FIG. 11.

First, glass material and mold member are heated. In this heating step, the glass material may be heated separately from the mold by heating cylinder 168 as in the case of said apparatus. Alternatively, it may be heated together with the mold by being placed in the mold member. The temperature of the mold member and the temperature of the glass material in the mold are controlled by the mold temperature control means 200E, and here the elevation of temperature up to the level which enables molding and the subsequent maintenance of temperature are controlled (Step 1).

At the time ($t_0$) when the temperature of the mold member and glass material reaches the predetermined temperature ($\phi_0$) and comes to a stable state, the pressurizing cylinder 222 is operated by the signal from mold open/close driving means 200C, whereby the upper mold member is caused to descend, and the mold is closed. The glass material is pressurized, the shape of the molding surface of mold member is transferred to the glass material, and the product is molded into the predetermined shape (Step 2). Then, at the time point ($t_a$) when pressurizing time is elapsed, cooling is started by the mold temperature control means (Step 3).

When the temperature reaches the level ($t_4$) . where the shape of the product stabilizes, the process is shifted to the step to take out the product. In the cooling step, when the signal indicating that the mold member has reached the predetermined cooling temperature is inputted from the mold temperature control means 200E to control means 200, said control means 200 outputs the signal for execution of take-out to the mold open/close driving means 200C. Said mold open/close driving means 200C outputs the signal to elevate the upper mold member in closed state to the first elevated position, and then the upper mold member moves from the position of closed state to the elevation required for detection of product position (the first elevated position) (Step 4). The first elevated position of the upper molding member is a position of elevation at which the product is not damaged when the product ascends in a state of adhesion to the upper mold member, is released from the upper molding member during ascending, and falls down on the lower mold member. It is also the position where the mold is open to enable sensing by the sensor 194. As far as we have confirmed, in the case when the product is a lens, no damage is caused to the molding surface of the mold and the product if the amount of elevation is less than the diameter of the lens. The result of work under such principle has been found satisfactory.

Control for shifting the first elevated position of the upper mold member is performed by inputting the signal of the sensor 192 into the mold position detecting means 200D. By the shifting signal to the first elevated position given by the mold position detecting means 200D, the operation signal is transmitted from control means 200 to product position detecting means 200F (Step 5).

In the product position detecting means 200F, the sensor 194 detects whether the product is adhering to the upper mold member or not. That is, upon receipt of signal from detection means 200F, sensor operating signal is output to sensor 194 and light projection signal is output by sensor 194. When the product is adhering to the upper mold, reflected light is detected by the light receiving device and light reception signal is output thereby. When the product is not adhering to the upper mold, no light reception signal is output (Step 6).

When the control means judges that the product is not adhering to the upper mold member on the basis of signal coming from product position detecting means 200F, product posture detection means 200G is operated in succession (Step 9). That is, based on the input signals comprising the light projection signals of sensors 196A, 196B and 196C which compose the posture detection sensor and the light reception signal obtained by the light reflected by the product, judgment is made whether or not the posture of the product on the molding surface of the lower molding member enable suction by hand or holding by holding hand other than suction (Step 10).

As the result of detection of product posture, if the posture is judged to be unsatisfactory (can not be held by the hand), alarm means 200H is engaged by the signal coming from detecting means 200G (Step 11).

In the aforesaid step, when judgment is made whether the product is adhering to the upper mold member or not and the product is found to be adhering to the upper mold, cooling rate of the upper mold member is increased (cooling slope is sharpened) by mold temperature control means 200E, whereby the temperature difference between the product and the upper mold member is positively formed, thus accelerating releasing of the product (Step 7). According to our experiments, it has been confirmed that in regard to adherence of product to the upper mold member, the product falls down within several seconds (for instance 5 second later) after stopping of the upper mold member at the first elevated position. Therefore, it may be so arranged that detecting signal of product position detecting means 200F is inputted into the time counting means and time sufficient for falling is counted, and then the upper mold member is caused to ascend (Step 8).

In the aforesaid judgment of posture, when the signal representing the state that product posture is good is output from the product posture detecting means 200G, signal is transmitted to mold open/close driving means 200C and the upper mold member is made to further ascend and moved to the second elevated position (Step 12).

Detection of the second elevated position of the upper mold member is executed by inputting the signal of said position sensor 192 to mold position detecting means 200D. When mold position detecting means 200D outputs the signal that the upper mold member has moved to the second elevated position, hand driving means is operated according to said output, hand is inserted into the open space formed in between the upper mold member and the lower mold member and it is moved to the position over the product. Succeedingly suction operation means is operated to execute suction/take-out operation of the product (Steps 13 & 14).

In the description of the steps of the aforesaid embodiment, output signal of product posture detecting means 200G may be used as the confirmation signal of the result of judgment of presence or absence of the product. By using said confirmation signal as the signal to start heating of mold and signal to start driving of hand, the cycle of product take-out may be shortened.

After such operation, suction means $190a$ and $190b$ of transportation section 126 are shifted in reverse order of introduction of molding material into the aforesaid press portion 128. The molded optical elements in the first press-molding machine $P_1$ and the second press-molding machine $P_2$ are respectively taken out by suction and are placed on the mounting table 166 of heating section 124. Finally the suction means $90a$ and $90b$ are set at the intermediate position shown in FIG. 6 ($T_{15}$ to $T_{19}$).

In the process of press-forming, that is, in the process of timing $T_{14}$ to $T_{16}$, for the purpose of heating the mounting table 166, the mounting table 166 is shifted to the inside of heating cylinder 168 by operating the cylinder 16C ($T_e$) and heated to an appropriate temperature. The mounting table 166 is caused to descend ($T_f$) by operating said cylinder 162 within the state of rotation driving means 192 being in intermediate position, that is, prior to timing $T_{15}$, so that said table is held so as to receive the molded material. This is same as the steps $T_a$ to $T_b$ stated before.

The step to take out molded material after press-molding is executed by overlapping the take-in step of press-molding material mentioned above. That is, after retracting the suction means 150 into the replacement chamber 108, taking-in of new molding material is conducted in the same way as the case of timing $T_0$ to $T_5$ ($T_{20}$ to $T_{26}$) and timing $T_{26}$ is so set as to come behind the said timing $T_{19}$. Before suction means 150 having been introduced into heating section 124 in said molding material take-in step returns from the reverse position to the reference position ($T_{26}$ to $T_{27}$), molded material on the mounting table 166 is sucked to the empty surface of suction means (i.e., the lower surface). That is, at the stage where suction means 150 reaches the upper part of mounting table 166, said mounting table is caused to ascend slightly and molded optical element on said mounting table is sucked by suction section at the lower side of suction means 150 after said mounting table 166 is caused to descend slightly the suction means 150 is turned over ($T_{27}$), said mounting table 166 is allowed to ascend slightly and molding material sucked to the suction section which has now become the lower side member is placed on the mounting table 166.

In the same way as the steps of said $T_8$ to $T_9$, suction means 150 is shifted from heating section 124 to the inside of the replacement chamber 108 ($T_{28}$) and then gate valve 110 is closed ($T_{29}$).

As in the aforesaid $T_c$ to $T_a$, mounting table 166 on which molding material is placed, is caused to ascend into the inside of heating cylinder 168 by said cylinder 162 after timing $T_{28}$, ($T_s$), it is heated to the appropriate temperature. Then, molding material $190a$ and $190b$ are respectively shifted into heating section 124 by the operation of rotation driving means 192. Prior to the suction of molding material from mounting table 166, said table is similarly caused to descend down to the lower limit position (ref. FIG. 1) by the operation of said cylinder 162 and takes stand-by position ($T_n$).

Thereafter, at transporting section 126 and press portion 128, the same steps as $T_{10}$ to $T_{15}$ are conducted.

On the other hand, gate valve 112 is opened ($T_{20}$), mounting table 138 on which a new molding material is further placed, is caused to ascend ($T_{31}$), and said molding material is sucked by the lower side of suction section of suction means 150 within the replacement chamber 108. Then said mounting table 138 is allowed to descend slightly. Transportation shaft 148 is turned 180° by rotary motor 152, suction means 150 is reversed ($T_{32}$), said mounting table is lifted slightly, and the molded optical element sucked to the suction section which has now become the lower side section, is placed on said mounting table 138. Next, said mounting table 138 is allowed to descend to the outside of the replacement chamber ($T_{33}$), and gate valve 112 is closed ($T_{34}$).

As stated above, molding material placed on the mounting table 138 is withdrawn as the product on the mounting table through said manufacturing steps.

According to the present invention, as detailed in the above, in the product take-out step following the steps of heating and pressurizing of glass material and the succeeding steps, the mold member is opened step-wise upon opening of the mold member, product position information is detected, and according to such position information, step is provided for cooling of mold or for keeping of mold in stand-by position for predetermined time, whereby it is possible to accelerate releasing the product from the upper mold member, to prevent damage of the product, and substantially to improve the rejection ratio of the product.

Also in the present invention, when the product is handled by mechanical means such as hand means, a step to detect the posture of product is provided prior to the product take-out action, whereby damage of product by said hand means is prevented, thus the trouble of emergency stop of the apparatus is prevented and automation can be promoted.

Particularly, in the present invention, occurrence of trouble of the apparatus can be prevented before it occurs by incorporating the step of alarming according to detection signal coming from the product posture detecting step into the process of the present invention.

What is claimed is:

1. A method of manufacturing an optical element, comprising the steps of:
    providing a mold comprising first and second mold members for press-molding glass material;
    heating the glass material and the first and second mold members simultaneously or separately;
    positioning the glass material between the mold members;
    closing the mold to pressurize the glass material and mold the same into a molded product having a shape conforming to molding surfaces of the mold members;
    cooling the molded product;
    taking out the molded product from the mold, said taking out step comprising the steps of;
    opening the mold by separating the mold members a predetermined distance during or after the cooling step;
    determining whether the molded product is adhered to the molding surface of the first mold member; and
    further opening the mold by further separating the mold members after said determining step determines that the molded product is not adhered to the molding surface of the first mold member; and
    removing the molded product.

2. A method according to claim 1, further comprising the step of determining the posture of the molded product if it is determined that the molded product is not adhered to the molding surface of the first mold member.

3. A method according to claim 1, further comprising the step of cooling the first mold member after determining the adherence of the molded product thereto.

4. A method according to claim 1, further comprising the step of starting heating of the mold members after the determination is made, in said determining step, that the molded product is not adhered to the molding surface of the first mold member.

5. A method according to claim 1, wherein the predetermined amount of movement of the mold member in the opening step is smaller than the diameter of the molded product.

6. A method of manufacturing an optical element, comprising the steps of:
    providing a mold comprising upper and lower mold members for press-molding glass material;
    heating the glass material and the mold members simultaneously or separately;
    positioning the glass material between the mold members;
    closing the mold to pressurize glass material and mold the same into a molded product having a shape conforming to molding surfaces of the mold members;
    cooling the molded product; and
    taking out the molded product from the mold members, said taking-out step comprising the steps of;
    opening the mold members a predetermined distance during or after completion of said cooling step;
    determining a position of the molded product between the mold members; and
    further opening the mold members to access the molded product after determining that the molded product is not adhered to the upper mold member; and
    removing the molded product.

7. A method according to claim 6, wherein the position of the molded product is determined a predetermined time after opening the mold members to said predetermined distance.

8. A method according to claim 6, wherein said opening step occurs during said cooling step, and further comprising the step of stopping the cooling step after determining the position of the molded product in said position determining step.

9. A method of manufacturing an optical element, wherein glass material for molding is accommodated between an upper member and a lower member of a mold, said glass material is heated to a desired temperature and press-molded, thereafter being cooled and released from the mold to form a product having a predetermined optical functional surface, said method comprising the steps of:
    molding the product by closing the mold;
    opening the mold by moving the mold members, relative to each other, from a closed position to a semi-open position, for a predetermined time, in which the mold members are opened to a predetermined distance as the molded product initially adheres to the upper mold member, wherein the predetermined time is controlled to e sufficient for the adhered molded product to be released from the mold member; and further opening the mold by additionally moving the mold members, relative to each other, to an opening position and removing the molded product.

10. A method according to claim 9, wherein the adherence of the molded product to the upper mold member and the releasing of the molded product from the upper mold is detected by using a sensor, and wherein movement of the mold members to the opening position is controlled in accordance with a detection signal from the sensor.

* * * * *

UNITED STATES PATENT AND TRADEMARK OFFICE
CERTIFICATE OF CORRECTION

PATENT NO. : 5,215,566
DATED : June 1, 1993
INVENTOR(S) : Yamamoto, et al.

It is certified that error appears in the above-indentified patent and that said Letters Patent is hereby corrected as shown below:

COLUMN 1:

Line 59, "ahered" should read --adhered--.

COLUMN 4:

Line 24, "$10 \times 10^{-2}$ torr," should read --$1 \times 10^{-2}$ torr,--.
Line 54, "3mm" should read --as 3mm--.

COLUMN 6:

Line 46, "gears" should read --engages--.

COLUMN 7:

Line 13, "point" should read --the point--.
Line 28, "means 190a" should read --means 190b--.

COLUMN 10:

Line 29, "$(\phi_0)$" should read --$(\Phi_0)$--.
Line 61, "Sunction" should read --Suction--.

COLUMN 12:

Line 3, "120° C." should read --120°--.
Line 10, "signals" should read --signals'--.
Line 29, "$(\phi_0)$" should read --$(\Phi_0)$--.

UNITED STATES PATENT AND TRADEMARK OFFICE
CERTIFICATE OF CORRECTION

PATENT NO. : 5,215,566
DATED : June 1, 1993
INVENTOR(S) : Yamamoto, et al.

It is certified that error appears in the above-indentified patent and that said Letters Patent is hereby corrected as shown below:

COLUMN 14:

Line 17, "means 90a and 90b" should read --means 190a and 190b--.

COLUMN 16:

Line 11, "the" (first occurrence) should be deleted.

COLUMN 17:

Line 1, "e" should read --be--.

Signed and Sealed this

Fifth Day of April, 1994

Attest:

BRUCE LEHMAN

*Attesting Officer*   *Commissioner of Patents and Trademarks*